United States Patent [19]
Lehovec
[11] 3,748,479
[45] July 24, 1973

[54] ARRAYS OF ELECTRO-OPTICAL ELEMENTS AND ASSOCIATED ELECTRIC CIRCUITRY

[76] Inventor: Kurt Lehovec, 11 Woodlawn Dr., Williamstown, Mass. 01267

[22] Filed: Dec. 14, 1971

[21] Appl. No.: 207,886

Related U.S. Application Data

[62] Division of Ser. No. 14,362, Feb. 26, 1970, Pat. No. 3,631,251.

[52] U.S. Cl. ............ 250/208, 250/220 M, 315/169
[51] Int. Cl. . H01j 39/12, H05b 37/00, H05b 39/00
[58] Field of Search .................... 250/220 MX, 208, 250/209, 211 J; 315/169

[56] References Cited

UNITED STATES PATENTS

| | | | |
|---|---|---|---|
| 2,998,546 | 8/1961 | Kuntz | 315/169 |
| 3,465,159 | 9/1969 | Stern | 250/211 J |
| 3,535,532 | 10/1970 | Merryman | 250/211 J |

*Primary Examiner*—James W. Lawrence
*Assistant Examiner*—T. N. Grigsby

[57] ABSTRACT

A solid material in shape of a parallelepipedon carries on one of its major surfaces a set of electric circuits, each connected to an electro-optical element for energy conversion between electric and radiative modes. The electro-optical elements are arranged in a row near a major edge of the parallelepipedon in such a manner that said radiative mode is directed perpendicular to said edge thus defining a row of points for light emission, reception or modulation along said edge. A set of such parallelepipedons is stacked to provide a two-dimensional array of such points for light emission, reception or modulation.

5 Claims, 11 Drawing Figures

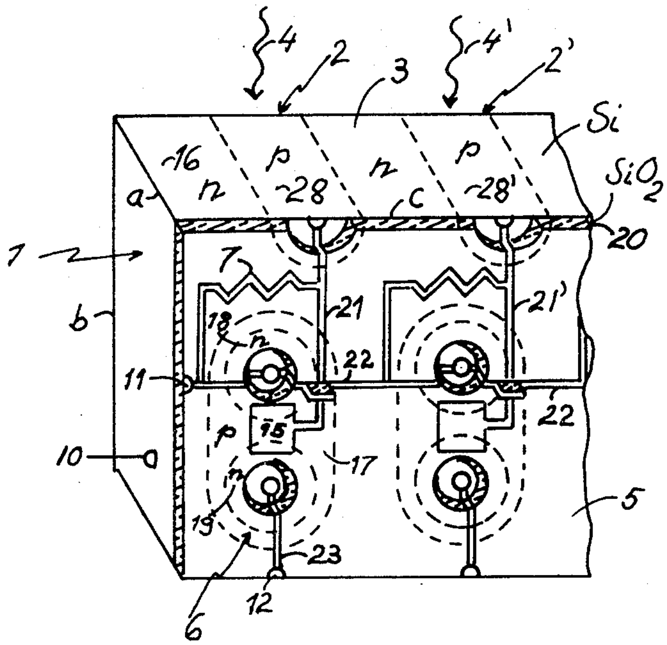
Fig.1
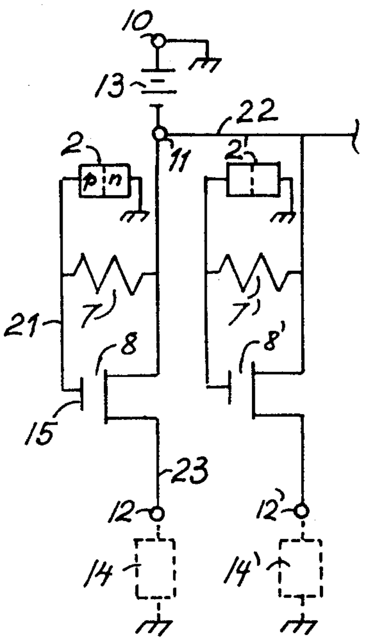
Fig.2 - Prior Art
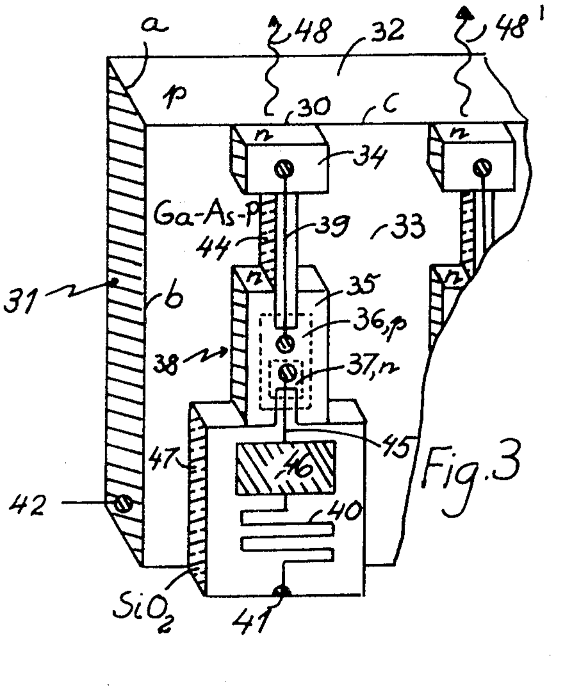
Fig.3
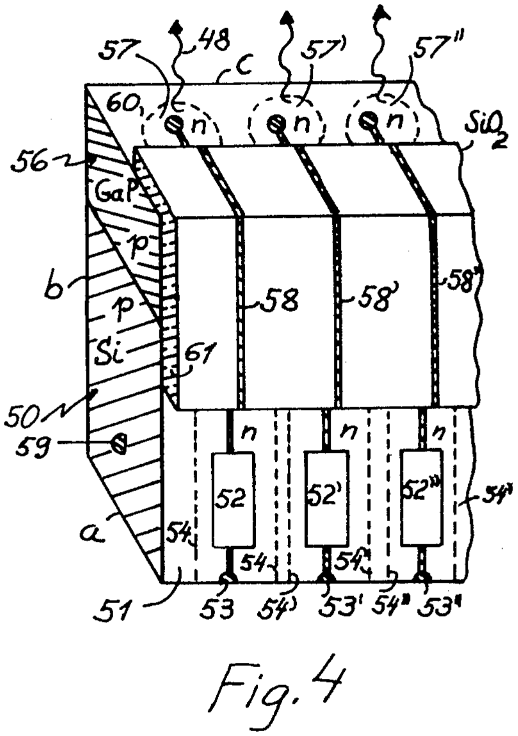
Fig.4

ARRAYS OF ELECTRO-OPTICAL ELEMENTS AND ASSOCIATED ELECTRIC CIRCUITRY

CROSS REFERENCE TO RELATED APPLICATION

This is a divisional case of my U.S. Patent application Ser. No. 14,362, filed Feb. 26, 1970 and now Pat. No. 3,631,251.

BACKGROUND OF INVENTION

This invention deals with the physical arrangement of electro-optical components and of associated electrical circuitry in electro-optical structures. In particular, this invention deals with the arrangement of large numbers of identical electro-optical elements, each combined with its own electric circuitry into one or two-dimensional arrays.

Electro-optical structures are hereafter defined as structures comprising electric circuitry functionally connected with electro-optical elements for purpose of generation of light, transformation of light into electric signals or modulation of light by electrical means. Optical means for focussing light in conjunction with the above-mentioned elements may or may not be part of these structures.

Two-dimensional arrays of electrically stimulated light emitters are well-known for display panels. Two-dimensional arrays of photocells are well-known for conversion of optical images into television signals. In many cases, these electro-optical elements are activated in sequence by a clock circuit and electrical processing of the optical signal emitted or received occurs in a stage common to all elements.

Provision of each electro-optical element with its own electrical processing stage has definite advantages. For instance, amplification of a weak electrical signal immediately adjacent to a photocell suppresses noise pickup or "cross talk" which may enter during transport of non-amplified weak signals to clock circuitry in the case that amplification occurs in a common stage after the clock circuit.

Hitherto, it has not been practical to provide each electro-optical element with its individual electrical circuits for the following reasons: First, cost appeared prohibitive until recently, when microcircuit technology became available. Second, space consideration appeared to exclude such an arrangement, considering that electro-optical elements are frequently spaced only about a mil apart in an array.

Electro-optical arrays such as used for television involve a very large number of identical elements, of the order of 1,000,000, and failure of only a few of these elements leads to total reject. My invention teaches the assembling of two-dimensional arrays from a set of linear arrays, which enables pretesting, and rejection of smaller entities if found faulty, thereby saving cost.

It is an objective of this invention to teach a new and advantageous arrangement for an array of electro-optical elements at close spacing, each comprising its associated electrical circuitry.

It is a further objective of this invention to teach a new and advantageous assembly of linear rows of electro-optical elements, each with associated electric circuitry, into two-dimensional arrays.

SUMMARY OF THE INVENTION

Briefly, the invention consists in arranging the electro-optical elements at or near one of the small faces of a rectangular slab with planar microcircuitry associated with each of said electro-optical elements at an adjoining major face of said slab. Typically, a linear row of electro-optical elements may be arranged along an edge of a slab, the associate circuitry to each element on the major face of the slab and extending in direction normal to said edge. Several such slabs can be stacked side by side with suitable insulation between them, thus providing a two-dimensional array of electro-optical elements. Contacts can be conveniently located at a major edge spaced from edge near which the electro-optical elements are located, with the second common contact being the bulk of the conducting slab.

BRIEF DESCRIPTION OF DRAWINGS

FIG. 1 shows a monolithic electro-optical structure according to this invention for transforming incident light into electric current.

FIG. 2 shows the prior art circuit pertaining to the structure of FIG. 1.

FIG. 3 shows a monolithic electro-optical structure according to this invention for generation of light flashes from a linear array of points.

FIG. 4 shows a hybrid electro-optical structure according to this invention for generation of light from a linear array of points.

PREFERRED EMBODIMENTS

Figure 5:
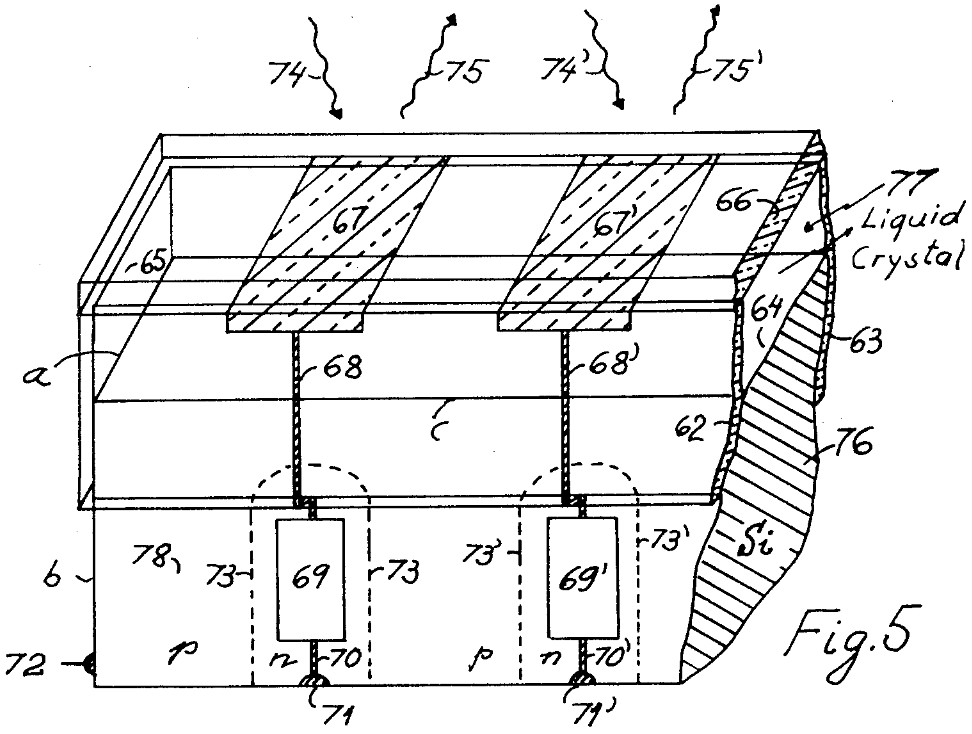
FIG. 5 shows a structure according to this invention for electric modulation of the intensity of reflected light at a linear array of points.

Referring to FIG. 1, there is shown a silicon slab 1 of edges *a*, *b*, *c* having p-n junction photocells 2, 2' between n-bulk 16 and p-regions 28, 28' on its face 3 of area $a \times c$ exposed to incident light marked by the arrows 4 and 4'. The large face 5 of area $b \times c$ carries an electric circuit 6 for amplification of the electric signal generated by 2 in response to 4. A diagram of circuit 6 is shown in FIG. 2 and consists of a resistor 7, n-channel insulated gate field effect transistor 8, the connections 10, 11 and 12 to power supply 13 and output load 14. Illumination of 2 increases the potential of gate 15 of 8 and thus increases current through output load 14 between terminals 10 and 12.

The circuit of FIG. 2 is realized in FIG. 1 by the n-p-n structure of n-bulk 16 with p-island 17 within which are n-islands 18 and 19, and the overlaid silicon oxide 20 which carries metallized gate 15 and metallized resistor 7. Contact lines 21, 22 and 23 extend over the oxide to connect 2 with 15 and terminals 11 and 12. Terminal 10 is a contact to the n-body 16. Buried and exposed p-n junctions are indicated by dotted lines. The p-n junction between 16 and 17 isolates 2 from 8. Contact lines 21 and 22 are insulated from each other at their crossover. Another identical structure is shown in FIGS. 1 and 2 and elements thereof are designated by primed numbers.

FIG. 3 shows the layout of a light emitting p-n junction diode 30 with associated circuitry according to this invention on slab 31 of p-type Ga-As-P. The light emitting junction 30 borders the small surface 32 of area $a \times c$ of 31. Portions of large surface 33 of area $b \times c$ of 31 are overlaid with an epitaxial n-layer of Ga-As-P, indicated by 34 and 35. N-layer 35 carries p-island 36 within which lies n-island 37, so that 31, 35, 36, 37 represent a p-n-p-n semiconducting controlled rectifier 38. P-region 36 of SCR 38 is connected to n-region 34 of light emitting junction 30 by path 39, which is insulated from substrate surface 33 by insulating film 44. N-region 37 is connected by line 45 to capacitor 46, and over resistor 40 to terminal 41. Dielectric of capacitor 46 is insulating film 47 and other electrode of capacitor is underlying p-region 33. Film 47 also insulates 40 and 41 from p-substrate 31. Other terminal of circuit is contact 42 to 31.

Application of positive d. c. potential at 42 with respect to 41 charges capacitor 46 over resistor 40. As voltage across 46 builds up, p-n junction 30 connected to 46 over p-region 36 of SCR 38 becomes conducting and emits light. However, current through 30 triggers SCR 38 which discharges 46 and cycle repeats itself. Result is a sequence of light flashes 48.

Microcircuits and structures of light emitting and light sensing electro-optical components will not be detailed in the following illustrations of the preferred embodiments. We shall elucidate the inventive concept of the geometrical arrangement of arrays of such microcircuits and electro-optical structures.

While examples so far have been of monolithic design, i. e., electro-optical element and electric circuit were portions of same single crystal slab, my invention encompasses hybrid structure comprising electro-optical elements and circuits of different materials. FIG. 4 shows a single crystal slab of p-type silicon 50 of side length *a, b, c* having on one of its major surfaces 51 of area $b \times c$ a set of planar microcircuits 52, 52′, 52″ terminating at contacts 53, 53′, 53″. These microcircuits are located on n-type islands of 50 and are insulated from each other and from p-type bulk of 50 by p-n junctions 54, 54′ and 54″. A face of area $a \times c$ of 50 is overlaid with strip of p-type GaP 56 carrying on its upper surface 60 the light emitting p-n diodes 57, 57′, 57″, which are connected to circuits 52, 52′ and 52″ by lines 58, 58′ and 58″, respectively. Other contact to diodes is through 56 and 50 by common terminal 59. 61 is an insulating film of $SiO_2$ separating 58 from p-substrates 50 and 56. Circuit 52 can be the SCR capacitor and resistor combination of FIG. 3 or any one of many circuits commonly employed with light emitting diodes 57.

FIG. 5 illustrates the arrangement according to this invention of an array of light modulating elements each having associated electrical circuitry. The light modulating element is a liquid crystal cell as described by Williams in U.S. Pat. No. 3,322,485. The silicon slab 76 is sandwiched between insulating transparent walls 62, 63 extending beyond the upper surface 64 of 76. Insulating transparent wall 65 and ceiling 66 together with 62, 63 and 64 create a boxlike hermetically sealed enclosure 77 containing liquid crystal. Inside portions of upper wall 66 are provided with transparent conducting staneous oxide coatings 67, 67′, etc. Contact lines 68, 68′, etc. to 67 and 67′ are located on outer surface of 62 and connect to planar microcircuits 69, 69′ located on silicon surface 78 part of which is substrate to 62. Lines 70, 70′ connect these microcircuits to external contacts 71, 71′. Contact 72 to 76 is common terminal for all liquid crystal cells. p-n junctions 73, 73′ insulate n-substrates of microcircuits 69, 69′ from p-bulk of 76. Circuit 69 can be a flip-flop or any other of the many circuits useful in conjunction with liquid crystal cells. Incident light beams 74, 74′ are reflected into outgoing beams 75, 75′ at surface 64 of silicon slab and intensity of outgoing beam 75 is modulated by voltage between 67 and silicon substrate surface 64. This voltage is applied through terminals 72 and 71 and processed by microcircuit 69 before reaching 67 through lead 68.

The preferred embodiments described in FIGS. 1, 3, 4 and 5 contained a row of photocells, light emitters or light modulators arranged along the major edge *c* of a parallelepipedon with a row of corresponding circuitry on the adjoining major face.

Figure 6:
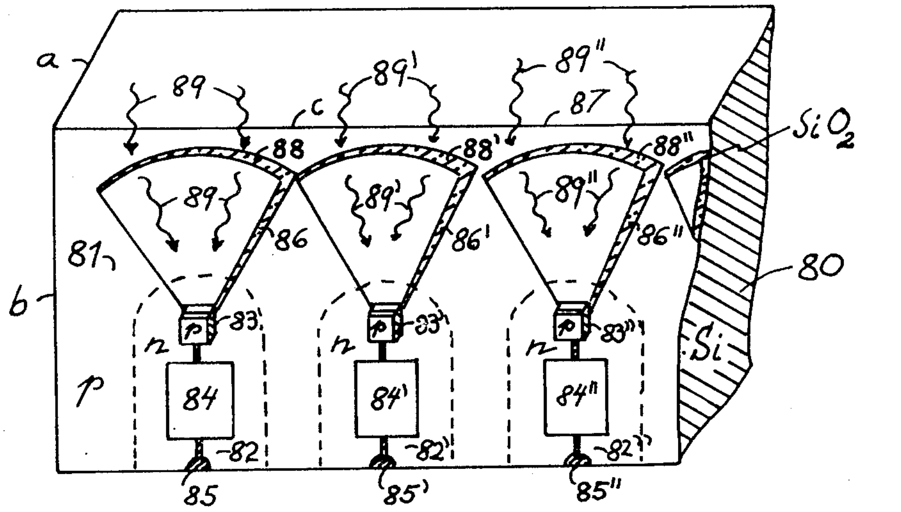
FIG. 6 shows a structure according to this invention having a linear array of optical-image forming means of the refractive type, each with an associated electro-optical element and with an electric circuit.
Figures 7, 8:
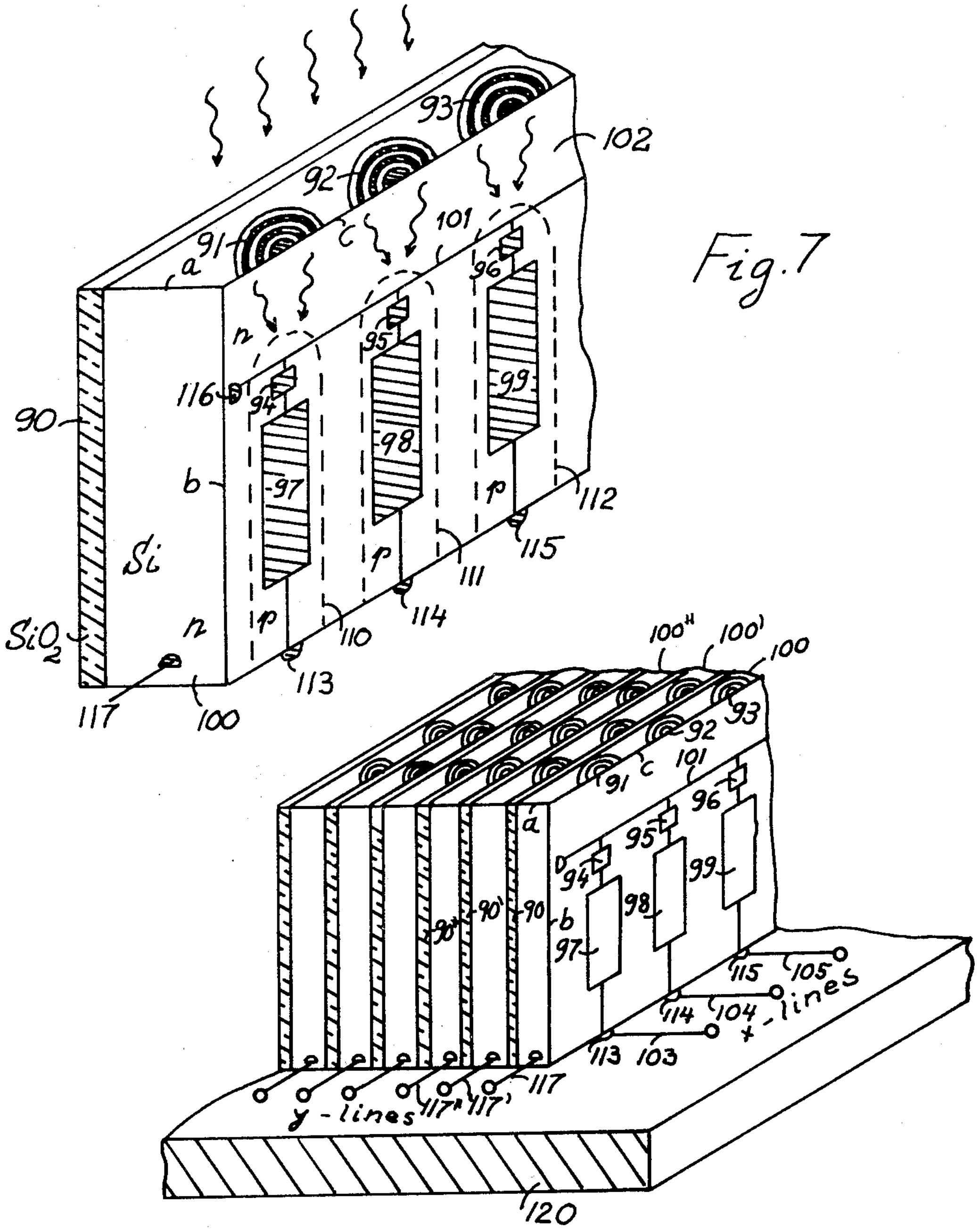
FIG. 7 shows another structure according to this invention having a linear array of image-forming means of the diffractive type, each with an associated electro-optical element and with an electric circuit.
FIG. 8 shows the arrangement of several structures as shown in FIG. 7 into a two-dimensional array of image-forming means.

The preferred embodiments to be described in FIGS. 6 and 7 contain a row of optical image-forming elements arranged along that major edge *c* with associated row of photoelectric and electric circuitry on the adjoining major edge *c* with associated row of photoelectric and electric circuitry on the adjoining major face. In FIG. 6, the optical image-forming elements are of the refractive type, and are located on said major face of area $b \times c$. They are designed for an incident (or outgoing) sheet of light. In FIG. 7, the optical elements are of the diffractive type and are located on a small face of area $a \times c$. Diffractive optical image-forming means can be used instead of the refractive elements of FIG. 6 and refractive optical image-forming means can be used instead of the diffractive elements of FIG. 7.

FIG. 6 shows a slab 80 of generally p-type silicon with edges of lengths *a, b, c* whose surface 81 contains n-type islands 82, 82′, 82″ which carry mesa-type elevations 83, 83′, 83″ of p-silicon, representing p-n junction photoelectric sensors. Planar microcircuits 84, 84′, 84″ located on 82, 82′ and 82″ are electrically connected to said sensors and to terminals 85, 85′, 85″. Portions of 81 are covered with transparent insulating films 86, 86′, 86″ of $SiO_2$ in the region between sensors 83, 83′, 83″ and upper edge 87. Upper boundaries 88, 88′ of 86, 86′, 86″ are curved to focus incident light beams 89, 89′, 89″ on sensors 83, 83′, 83″. p-n junctions between p-bulk of 80 and n-type islands 82, 82′, 82″ provide insulation between microcircuits 84, 84′, and 84″.

FIG. 7 illustrates the arrangement of a row of optical elements 91, 92, 93 located on the small face of area $a \times c$ of a rectangular n-type silicon slab 100 of dimensions $a < b < c$. The side length $a$, $b$, $c$ might be of the order of 2, 10 and 100 mils, respectively.

The optical elements 91, 92, 93 are halves of circular zone plates. The major planar surface 102 of area $b \times c$ carries a row of photocells 94, 95, 96 located at image points of the zone plates. Associated microcircuitry 97, 98 and 99 for photocells 94, 95, 96 is also located on surface 102. Each microcircuit extends essentially in $b$-direction toward contacts 113, 114, 115. Associated circuitry 97, 98, 99 can be amplifiers or any suitable circuits. The circuits 97, 98 and 99 are located on p-type islands and are insulated from each other by p-n junctions 110, 111 and 112. Contact to this circuitry is made by the metal dots 113, 114 and 115 which are located at the bottom section of area $a \times c$, opposite to the optical elements 91, 92 and 93. Other contact is common lead 101 from photocells to n-body contact 116 and contact 117 to the n-body of the wafer on side face of area $a \times b$.

Photocells 94, 95 and 96 must be responsive to radiation focussed by 91, 92 and 93 for which silicon is transparent. The face of area $b \times c$ which does not carry circuitry 97, 98 and 99 is coated by $SiO_2$-layer 90 for insulation between slabs when stacked as shown in FIG. 8 to provide a two-dimensional array.

FIG. 8 shows slabs 100, 100', 100'' of type illustrated in FIG. 7 stacked side by side on an insulating substrate 120. The substrate contains spaced printed contact lines 103, 104 and 105 to which the contacts 113, 114, 115 of wafer 100 and corresponding contacts of wafers 100', 100'', etc. are soldered. The lines 103, 104, 105 in conjunction with the contacts 117, 117', 117'', etc. provide X-Y access for activating electrically an individual photocell such as 94, 95 or 96.

The photocell elements 94, 95 and 96 in FIG. 7 and 83, 83' and 83'' in FIG. 6 can be replaced by light emitters providing a light emitting array. The microcircuit shown in these figures can be any circuits known to be useful in conjunction with sensors or light emitters, including gate circuitry to switch on or off the individual electro-optical elements.

The arrangement of many slabs, each having one-dimensional array of electro-optically active points on a small face into a two-dimensional array by stacking as shown in FIG. 8 for the slab of FIG. 7 can be utilized also for the slabs shown in FIGS. 1, 3, 4, 5 and 6.

Figure 9:
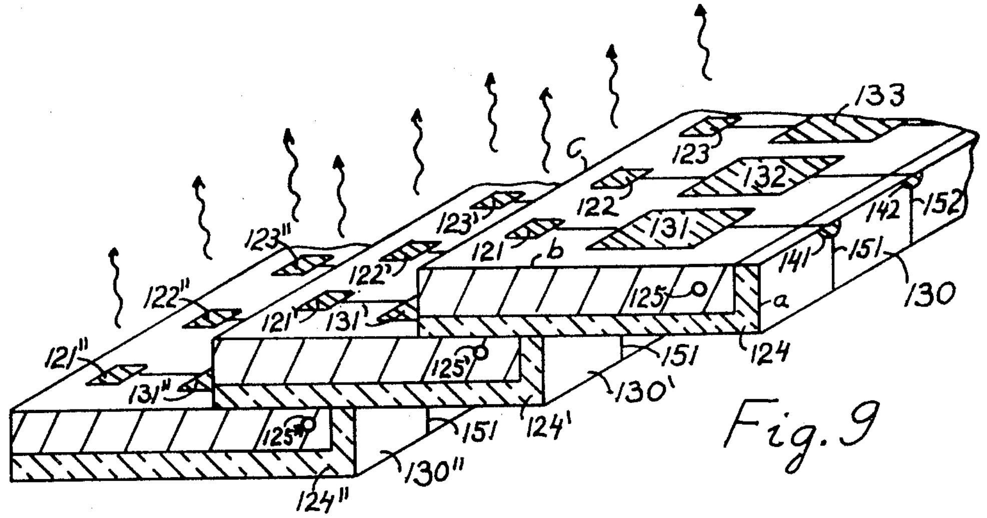
FIG. 9 shows another arrangement according to this invention of individual slabs each with a linear array of electro-optical elements to produce a two-dimensional array.

FIG. 9 shows another preferred embodiment for arranging slabs having one-dimensional arrays of photoelectric elements to provide two-dimensional arrays, according to this invention.

In FIG. 9 there are three identical slabs 130, 130'' and 130''. Slab 130 has a row of light emitting elements 121, 122, 123 placed along the direction of the longest edge $c$ and located on a major face of area $b \times c$ with associated microcircuits 131, 132 and 133 on the same face. Each microcircuit extends substantially in the $b$-direction, i. e., at right angles from the direction of the row of light emitting elements. This provides for each microcircuit an area of about $l \times b$, when $l$ is the spacing of light emitting elements. Each microcircuit is electrically connected to one of the light emitting elements 121, 122, 123 and to one of the contacts 141, 142 or 143 (not shown). Other common contact is 125 to bulk of slab 130. Rear surface of slabs is insulated by layer 124. Light emission from 121, 122, 123 occurs orthogonal to surface of area $b \times c$ on which emitters are located. Therefore, in stacking slabs 130, 130', 130'' to obtain two-dimensional arrays, slabs are displaced against each other along direction of $b$-edge to expose rows of light emitting elements 121, 122, 123; 121', 122', 123'; 121'', 122'', 123'', etc. Contacts 125, 125', 125'' provide Y-access lines. Contact 141 of slab 130 is connected by line 151 to contacts 141', 141'', etc. Similarly, contacts 142, 142', 142'' are connected by 152 and so forth to provide X-access lines of an X-Y address system.

The slabs are held together by fixing them to a vertical insulating plate on rear surfaces of area $a \times b$ of slabs, not shown in figure.

Light emitting elements 121, 122, 123 can be replaced by light modulating means or by photocells. Examples for these elements and for associated microcircuitry can be taken from FIGS. 1, 3, 4 and 5 with appropriate modifications due to fact that light beams in FIG. 9 are emitted or incident substantially along direction of $a$-edge (i. e., perpendicular to face of area $b \times c$), while in previous figures light was incident along $b$-edge, i. e., perpendicular to face of area $a \times c$.

In a variation of structure of FIG. 9, light emitting elements 121, 122, 123 can be light emitting p-n junction diodes, located on surface of area $a \times c$, and emitting light in direction parallel to $a$-edge. The light emitting diodes can be of the mesa-type, such as shown in FIG. 6 for diodes extending from the $b \times c$ plane. Only a very small lateral displacement along $b$-edge in stacking operation would now be required to expose the light emitted parallel to the $a \times c$-face from the various slabs. This displacement would be of the order of the height of mesa-elevations of light emitting diodes.

Figure 10:
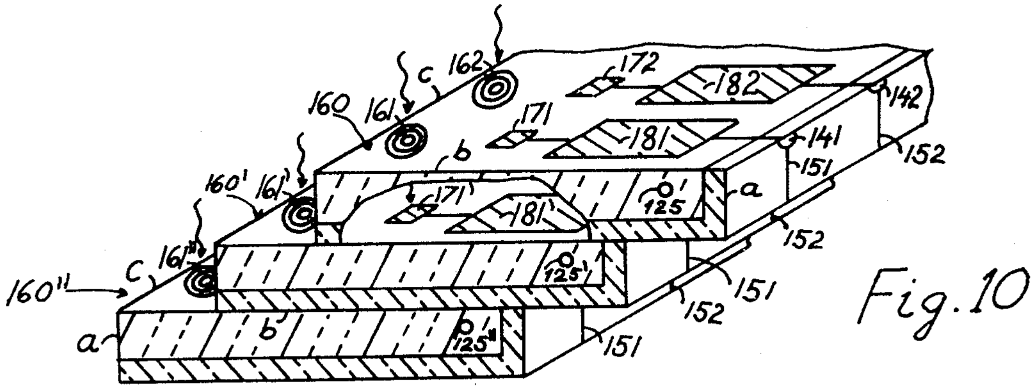
FIG. 10 shows still another arrangement according to this invention of individual slabs each having a linear array of optical means and of electro-optical elements to produce a two-dimensional array.

FIG. 10 shows the stacking procedure of identical slabs 160, 160', 160'' containing rows of optical focussing means 161, 162, 161', 161'', etc. photoelectric sensors 171, 172, 171', etc. and microcircuits 181, 182, 181', etc. in circuit connection with these sensors.

Identical combinations of focussing means, sensors and microcircuits are located in each slab, spaced in direction of $c$-edge. Slabs are stacked along faces of area $b \times c$, with displacement along $b$-direction to align optical means 161 of slab 160 with sensor 171' of slab 160'. Portion of slab 160 is cut back to show this alignment. Optical means 161 is a zone plate designed to focus monochromatic radiation for which underlying bulk of slab 160 is transparent on sensor 171'.

In another preferred embodiment sensor 171' and associated microcircuit 181' are prepared on lower surface of slab 160 rather than upper surface of slab 160', i. e., sensor and associated optical means are located on opposite surface of same slab and their alignment is then independent of precision in displacement of slabs by stacking operation.

Figure 11:
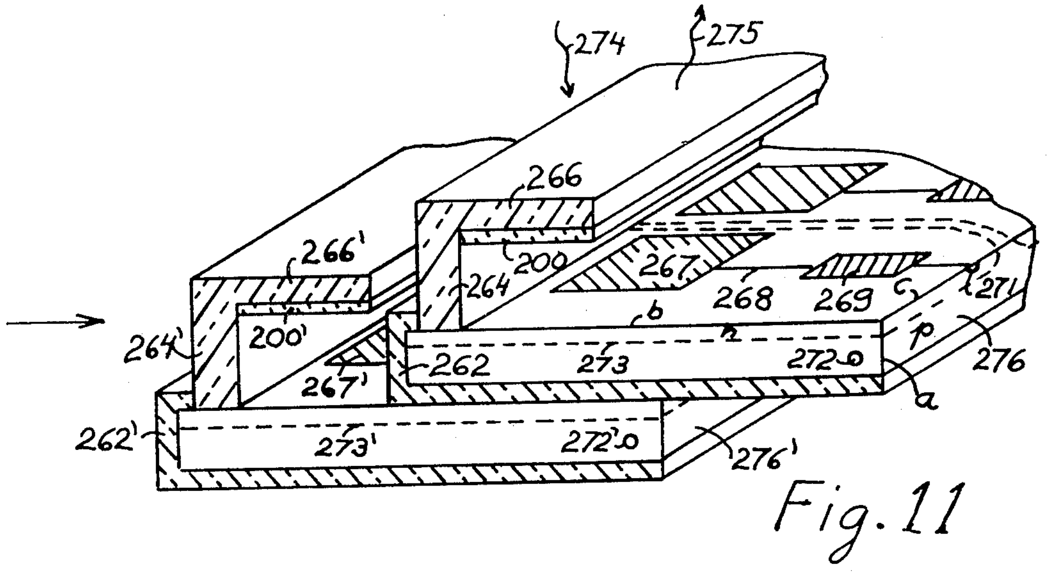
FIG. 11 shows the pre-assembly stage of structures with linear rows of light-modulating elements into a two-dimensional array arrangement of type of FIG. 10.

The stacking principle demonstrated in FIGS. 9 and 10 is applicable also to light modulating structures. A preferred embodiment is shown in FIG. 11. The individual slab design has been modified somewhat from the corresponding case of FIG. 5, since the light is now substantially incident and reflected in the direction of the $a$-edge. Components of structure in FIG. 11 have been given numbers of FIG. 5 with digit 2 in front to simplify comparison. Only two slabs are shown in FIG. 11 in a pre-assembly stage. For final assembly, push lower left slab toward upper right slab along horizontal arrow.

P-type silicon slab 276 contains n-type island insulated by junction 273. Microcircuit 269 on n-type island is connected by lead 268 to conducting layer 267, which is one contact to liquid crystal cell for electric modulation of incident and reflected beams 274, 275. Walls of liquid crystal cell of contact 267' on slab 276' is oxide coated face 262 on slab 276 and transparent cover plate 266', and transparent insulating plate 264'. Lower surfaces of 266 and 266' are provided with conducting transparent layers 200, 200' which are connected over a lead on a vertical side wall (not shown) to p-bulk of slabs 276 and 276', respectively. Incident light beam 274 is reflected on 267 into light beam 275 and intensity of 275 is modified by electrical potential applied between contacts 272 and 271 fed over microcircuit 269 to electrodes 267 and 200 of liquid crystal cell.

As there are many different circuits, and electro-optical and optical components which might be arranged according to my invention, it should be understood that this invention is not limited by the preferred embodiments described, but encompasses all structures characterized by the following claims.

What is claimed is:

1. A two-dimensional array of electro-optical elements, each said electro-optical element associated with one microcrcuit, said two-dimensional array comprising a stack of slabs of side lengths $a << b << c$, each said slab containing a linear row of said electro-optical elements extending substantially along one of its $c$-edges, with said associated microcircuits extending substantially in the $b$-direction, said slabs stacked along faces of sides $b \times c$ and exposing said linear rows of electro-optical elements.

2. The two-dimensional array of claim 1, whereby there is a common contact to all electro-optical elements on each slab and a separate contact to each electro-optical element on said slab through said associated microcircuit, a common electrical connection among correspondingly located microcircuits on different slabs, whereby said contacts to each slab and said common contacts to all correspondingly located microcircuits on different slabs provide an X-Y address system for each individual electro-optical element.

3. The two-dimensional array of claim 1 where at least a portion of each said photoelectric element is located on a face of side length $a \times c$ of said slabs, and said slabs are stacked so that faces of side length $a \times c$ are aligned substantially in a plane.

4. The two-dimensional array of claim 1 whereby each of said photoelectric elements is located on a face of side length $b \times c$ of said slab, and said photoelectric elements in the stack are exposed by a displacement of said stacks against each other said displacement occurring substantially along the sides of length $b$.

5. A linear array of photo-optical elements with associated circuitry, said array located on a slab of side lengths $a << b << c$, whereby said electro-optical elements are aligned along an edge of length $c$ on said slab and are located on a face bounded by edges of length $b$ and $c$; each said electro-optical element having an associated microcircuit located on said same face bounded by edges of lengths $b$ and $c$; and each said microcircuit extending substantially in direction parallel to the edges of length $b$.

* * * * *